(12) United States Patent
Mackin

(10) Patent No.: US 9,452,721 B2
(45) Date of Patent: Sep. 27, 2016

(54) SYSTEMS, METHODS, AND APPARATUS FOR AN EMERGENCY POWER GENERATOR

(71) Applicant: The Boeing Company, Chicago, IL (US)

(72) Inventor: Steve Mackin, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 433 days.

(21) Appl. No.: 14/044,463

(22) Filed: Oct. 2, 2013

(65) Prior Publication Data

US 2015/0091375 A1 Apr. 2, 2015

(51) Int. Cl.
*B60R 16/03* (2006.01)
*F03B 9/00* (2006.01)
*F03D 5/02* (2006.01)

(52) U.S. Cl.
CPC .............. *B60R 16/03* (2013.01); *F03B 9/005* (2013.01); *F03D 5/02* (2013.01); *Y02E 10/20* (2013.01); *Y02E 10/70* (2013.01)

(58) Field of Classification Search
CPC ........................................ B60R 16/03
USPC ................................. 307/153, 10.1
See application file for complete search history.

(56) References Cited

U.S. PATENT DOCUMENTS

| 3,887,817 A * | 6/1975 | Steelman | F03B 13/264 |
| | | | 290/43 |
| 2003/0066934 A1 | 4/2003 | Bolonkin | |
| 2008/0303285 A1 | 12/2008 | Bondhus | |

FOREIGN PATENT DOCUMENTS

| DE | 21614 C | 3/1883 |
| DE | 25332 C | 1/1884 |
| EP | 1878916 A1 | 1/2008 |
| FR | 2736101 A1 | 1/1997 |
| FR | 2970525 A1 | 7/2012 |
| WO | 2012067533 A1 | 5/2012 |

OTHER PUBLICATIONS

"European Application Serial No. 14187318.2, Search Report mailed Feb. 19, 2015", 6 pgs.

* cited by examiner

*Primary Examiner* — Robert Deberadinis
(74) *Attorney, Agent, or Firm* — Kwan & Olynick LLP

(57) ABSTRACT

Systems, methods, and apparatus are disclosed for generating power for a vehicle. A power generator may include a first loop configured to be deployed from a portion of a vehicle. The power generator also includes a first plurality of resistive devices coupled to the first loop, at least one resistive device of the first plurality of resistive devices being configured to transfer a force to the first loop. The power generator may also include a pulley coupled to the first loop, the pulley being configured to receive the force transferred to the first loop, and the pulley being further configured to rotate in response to receiving the force from the first loop. The power generator may also include a generator coupled to the pulley, the generator being coupled to an electrical system, and the generator being configured to deliver power to the electrical system in response to the pulley rotating.

20 Claims, 9 Drawing Sheets

SYSTEMS, METHODS, AND APPARATUS FOR AN EMERGENCY POWER GENERATOR

TECHNICAL FIELD

This disclosure generally relates to vehicles and machinery and, more specifically, to power generators associated with vehicles.

BACKGROUND

In operation, a vehicle, such as an airplane, may experience a situation or condition that results in a loss of power. The loss may be of electrical power or hydraulic power. When such a loss occurs, an emergency power generator may be deployed to generate additional power. Conventional emergency power generators use ram air turbines which include a turbine that generates power from the airstream flowing by the vehicle. However, the size of the turbine is limited based on various factors, such as installation constraints, a vehicle geometry, weight, and landing gear height. Thus, the power generated by the turbine is limited and might not be sufficient to meet the needs of the vehicle. Furthermore, once the turbine is deployed it cannot be retracted.

SUMMARY

Provided are one or more power generators that may be used to generate power for one or more vehicles. The power generators disclosed herein may be deployed from a vehicle to generate additional power for the vehicle. The power generator may include a loop of resistive devices that may be deployed from a portion of the vehicle. One or more parameters of the resistive devices as well as the location from which they are deployed may be configured to obtain a high power to weight ratio sufficient to meet the vehicle's power needs.

Thus, according to some embodiments, an apparatus for generating power is disclosed. The apparatus may include a first loop configured to be deployed from a portion of a vehicle. The apparatus may also include a first plurality of resistive devices coupled to the first loop, at least one resistive device of the first plurality of resistive devices being configured to transfer a force to the first loop, the force being generated based on an aerodynamic drag associated with the at least one resistive device. The apparatus may further include a pulley coupled to the first loop, the pulley being configured to receive the force transferred to the first loop, and the pulley being further configured to rotate in response to receiving the force from the first loop. The apparatus may also include a generator coupled to the pulley, the generator being further coupled to an electrical system, and the generator being configured to deliver power to the electrical system in response to the pulley rotating.

In some embodiments, each resistive device of the first plurality of resistive devices is a parachute. The first plurality of resistive devices may be configured to generate 1000 pounds of force, and the generator may be configured to generate 60 kilowatts. Each resistive device of the first plurality of resistive devices may be a pocket coupled to the first loop. In some embodiments, each resistive device of the first plurality of resistive devices is configured to toggle between a first configuration and a second configuration in response, at least in part, to a rotation of the first loop. Each resistive device of the first plurality of resistive devices may be configured to generate force when in the first configuration, and further configured to generate virtually no force when in the second configuration. In some embodiments, the apparatus may further include a gearing mechanism configured to couple the pulley to the generator. The apparatus may also include a locking mechanism, the locking mechanism being configured to prevent a rotation of the first loop, and the first plurality of resistive devices being configured to operate as a drag chute in response to the locking mechanism preventing the rotation of the first loop. In some embodiments, the generator may be located along a centerline of a portion of an airplane. The apparatus may further include a second loop coupled to the pulley, and a second plurality of resistive devices coupled to the second loop. The first loop may be configured to generate a first amount of power for a first set of vehicle systems, and the second loop may be configured to generate a second amount of power for a second set of vehicle systems. The generator may be configured to provide the first amount of power to a vehicle's high power systems during low altitude operation, and the generator may be further configured to provide the second amount of power to the vehicle's low power systems during high altitude operation.

In some embodiments a method for generating power is provided. The method may include: deploying a loop from a portion of a vehicle, the loop being coupled to a plurality of resistive devices; generating a force based on an aerodynamic drag associated with the at least one resistive device of the plurality of resistive devices; transferring the force to the loop, the transferring causing the loop to rotate; receiving, at a pulley coupled to the loop, the force transferred to the loop, the receiving causing the pulley and a shaft associated with the pulley to rotate; and generating, at a power generator coupled to the pulley, power in response to rotating the pulley.

In some embodiments, each resistive device of the plurality of resistive devices is a pocket coupled to the loop. In various embodiments, each resistive device of the plurality of resistive devices is a parachute. The plurality of resistive devices may generate 1000 pounds of force, and the generator may generate 60 kilowatts. In various embodiments, the method further includes: generating a first signal, the first signal indicating that the loop has been deployed; and generating a second signal, the second signal providing data about the operation of one or more of the loop, pulley, and generator. The method may also include: locking, using a locking mechanism, the pulley and loop, wherein the locking prevents the rotation of the pulley and loop; and generating, using at least one resistive device of the plurality of resistive devices, reverse thrust.

In various embodiments, a system for generating power for an airplane is disclosed. The system may include an airplane having a rear portion. The system may further include a loop configured to be deployed from the rear portion of the airplane and a plurality of resistive devices coupled to the loop, at least one resistive device of the plurality of resistive devices being configured to transfer a force to the loop, the force being generated based on an aerodynamic drag associated with the at least one resistive device. The system may also include a pulley coupled to the loop, the pulley being configured to receive the force transferred to the loop, and the pulley being further configured to rotate in response to receiving the force from the loop. The system may further include a generator coupled to the pulley, the generator being coupled to an electrical system, and the generator being configured to deliver power to the electrical system in response to the pulley rotating.

DETAILED DESCRIPTION

Figure 1:
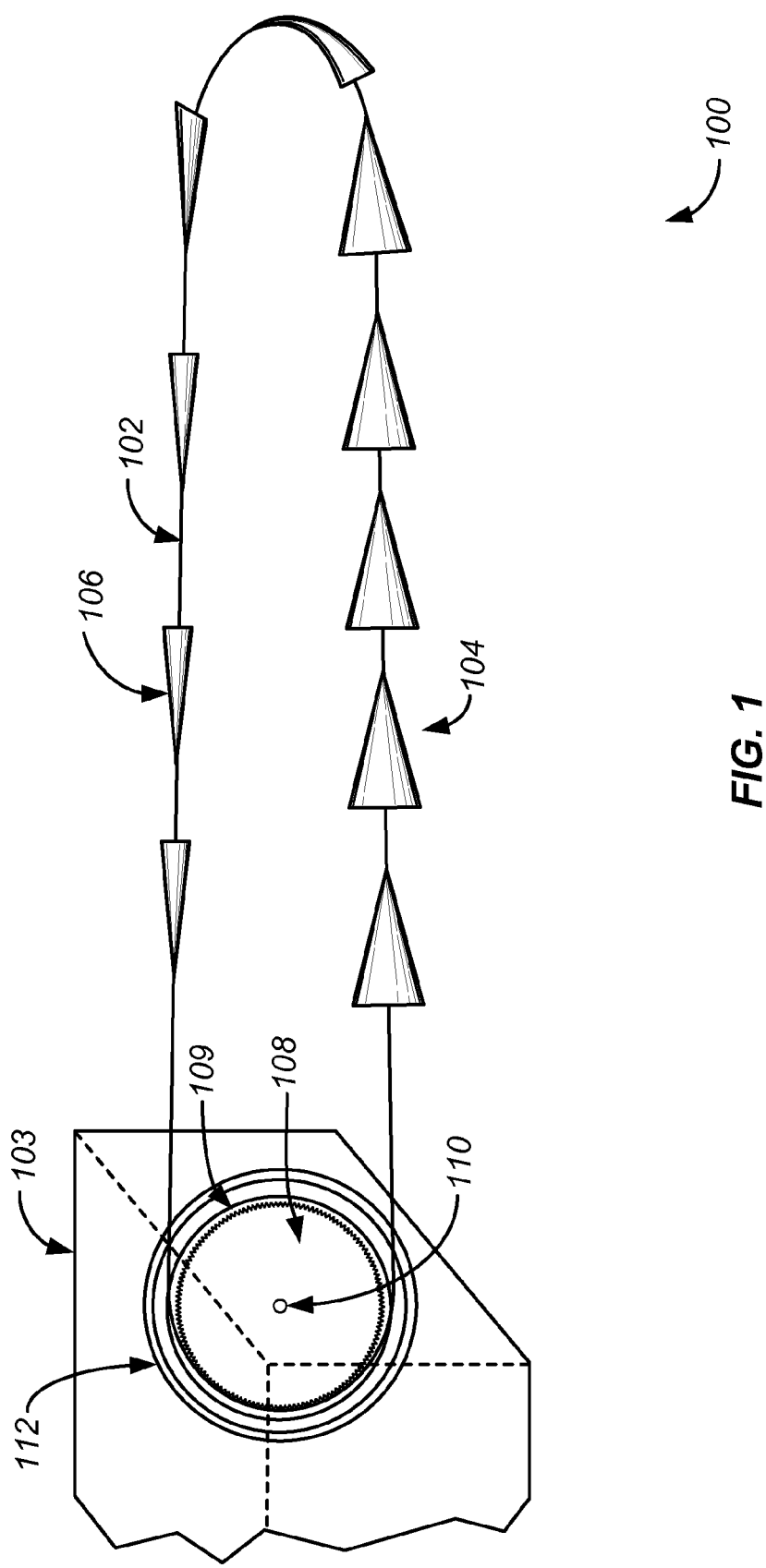
FIG. 1 illustrates an example of a power generator that may be deployed from a vehicle, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

In the event of loss of power in a vehicle, such as an airplane, conventional power generation methods utilize a ram air turbine to generate emergency power. The ram air turbine may include a small turbine that is connected to generator. The air turbine may be deployed from a fuselage section of the vehicle and may use an airstream or flow of air past the vehicle to generate power for some systems of the vehicle. However, due to the geometry and design of the air turbine, the size of the air turbine must be within certain limits. For example, the size of the air turbine cannot be too large or too heavy to be coupled with or stored in the vehicle. Thus, the size of the air turbine is limited by various vehicle dependent parameters, such as installation constraints, payload capabilities, and landing gear height. Because the size of the ram air turbine is limited by vehicle parameters, such as ground clearance and landing gear height, the power generated by the turbine remains limited. As vehicles and aircraft develop more intricate, complicated, and developed electrical and hydraulic systems, their power needs will increase. Due to their limitations, conventional ram air turbines may be unable to meet these increased needs. Moreover, conventional ram air turbines require a strut for support. The strut may be a heavy component that increases the weight associated with the ram air turbine. Further still, once deployed, conventional ram turbines cannot be retracted.

Various embodiments disclosed herein are capable of generating power while not being limited by these constraints. In various embodiments, several resistive devices, which may be chutes or pockets, may be coupled to a loop that is deployed from a portion of a vehicle, such as an empennage section of an airplane. The loop may be coupled to a pulley and shaft, which may be coupled to an electrical generator or hydraulic pump. In operation, the loop may be deployed into an airstream flowing by the vehicle. The resistive devices may cause the loop to rotate, as well as the pulley and shaft. The generator may convert the rotation of the shaft to power, thus generating power for the vehicle. In this way, resistive devices, such as drag chutes, may be utilized to spin a shaft attached to a generator or hydraulic pump and generate power for the vehicle. The size and number of the resistive devices may be determined based on an amount of power to be generated.

The embodiments disclosed herein may have a significantly higher power to weight ratio that conventional methods which use a ram air turbine. Various embodiments disclosed herein do not require a strut. Furthermore, systems and apparatus disclosed herein may be installed in more locations on the vehicle, which may be an aircraft. Additionally, various embodiments disclosed herein may be configured to provide reverse thrust capabilities. Multiple chute loops may be utilized to generate different amounts of power/thrust reverse. Furthermore, a loop may be cut loose if accidentally deployed or if emergency power is no longer needed.

FIG. 1 illustrates an example of a power generator that may be deployed from a vehicle, in accordance with some embodiments. As previously discussed, a vehicle such as an airplane may experience a loss of power or other situation in which additional power is needed to meet the power needs of the vehicle. In such a situation, one or more components of a power generation apparatus or system, such as power generator 100, may be deployed. In this way, power generator 100 may convert one or more forces into power or electrical energy. The one or more forces may be generated by or result from the motion of the vehicle. For example, the force may be a frictional force or drag generated by air that the vehicle is passing through. Power generator 100 may include a plurality of resistive devices and other components that are configured to convert the force into electrical energy that may be used by the vehicle.

Accordingly, power generator 100 may include loop 102 which may be a loop of material capable of being deployed from the vehicle that houses power generator 100. Thus, loop 102 may include a material that is flexible, compressible, and/or packable to enable loop 102 to be stored in storage compartment 103 of the vehicle when loop 102 is not deployed. The loop of material that includes loop 102 may be configured to have a particular length and width. A length of loop 102 may be determined based on a desired power output and a number of resistive devices that are coupled to loop 102 to obtain the desired power output, as discussed in greater detail below. A width of loop 102 may be selected such that sufficient material is present to enable coupling of loop 102 to the plurality of resistive devices. Thus, loop 102 may be wide enough to enable a fastening device to couple a resistive device, such as resistive device 104, to loop 102. As previously mentioned, loop 102 may be stored in storage compartment 103 when not in use. When loop 102 is deployed, as shown in FIG. 1, one or more external doors of storage compartment 103 may open and the entirety of loop 102 may unfurl and be configured to rotate as a fully extended loop. Loop 102 may be configured to be deployed automatically or in response to a user input. For example, one or more computer systems of the vehicle may detect or identify a condition, such as a loss of electrical or hydraulic power in one or more of the vehicle's systems. In response to detecting the condition, the external doors of storage compartment 103 may be opened, and loop 102 may be deployed. It will be appreciated, that while FIG. 1 illustrates loop 102 configured to rotate in a first direction, such as a counter-clockwise direction, loop 102 may also be configured to rotate in a second direction, such as a clockwise direction.

As previously mentioned, loop 102 may include or be coupled to a plurality of resistive devices, such as resistive device 104 and resistive device 106. A resistive device may be a device configured to create or generate a resistance to a medium through which the vehicle is travelling or passing through. For example, an airplane may be passing through air. Accordingly, the resistive device may be a parachute, such as a drag chute, that resists a flow of the air by the airplane. In various embodiments, the resistive device may be made of or may comprise a material such as canvas, silk, nylon, Kevlar®, and Terylene. Materials such as silk may exhibit superior strength, lightness, thinness, and fire-resistance. Nylon also has the benefit of being resistant to mildew, and has good elasticity. Furthermore, Kevlar® and Terylene may are synthetic fabrics that may provide great strength and heat resistance. Loop 102 may be coupled to a plurality of resistive devices. Thus, returning to the previous example, a plurality of parachutes may be coupled to loop 102 and be configured to generate a resistance to the air through which the vehicle is passing.

In various embodiments, the plurality of resistive devices is capable of being configured in a first configuration and a second configuration. A resistive device may toggle between the first configuration and the second configuration based on a position of the resistive device on loop 102 relative to a flow of the medium through which the vehicle is passing. When in the first configuration, a resistive device may be configured to generate a resistive or drag force based on the flow of a medium past the vehicle. When in the second configuration, a resistive device may be configured to generate significantly less force and no resistance to the flow of the medium past the vehicle. As shown in FIG. 1, the plurality of resistive devices may be parachutes or drag chutes. When the apex of the resistive device, which may be a chute, is coupled to loop 102 such that the apex points away from the vehicle and in a direction that is the same direction as a flow of the medium through which the vehicle travels, the resistive device may be in the first configuration. Alternatively, when the apex of the resistive device is coupled to loop 102 such that the apex is pointed towards the vehicle and against the flow of the medium, the resistive device may be in the second configuration.

Accordingly, resistive device 104 may be a resistive device that is configured in the first configuration. In this instance, resistive device 104 is a parachute that is deployed and is configured to resist the flow of the air through which an airplane is traveling. Thus, an apex of resistive device 104 may be coupled to loop 102 via a fastening device, which may be one or more staples or stitches. The lower rim of the parachute of resistive device 104 may be coupled to loop 102 via a line or wire, thus restricting the extent to which the parachute can open. Resistive device 106 may be a resistive device that is configured in the second configuration. In this instance, resistive device 106 is a parachute that has the same dimensions as resistive device 104. However, resistive device 106 is not open, and is collapsed. Thus, when in the second configuration, resistive device 106 is not open and does not generate a significant resistive force or otherwise offer much resistance to a flow of air past the airplane. In operation, each resistive device of the plurality of resistive devices may toggle between the first configuration and the second configuration as loop 102 rotates, thus generating and transferring a rotational force to loop 102 in one rotational direction. Various configurations of resistive devices are disclosed herein with reference to FIG. 1, and discussed in greater detail below with reference to FIG. 2A through FIG. 2D.

In various embodiments, the open diameter of the parachute may be determined based on an amount of power that is to be generated by power generator 100. For example, resistive device 104 may be 48 inches in diameter when deployed in the first configuration that is configured to generate a resistive force. In this example, resistive device 104, as well as other resistive devices coupled to loop 102, may collectively generate 1000 pounds of force if the vehicle is traveling at 500 feet per second, or approximately 341 miles per hour. The resistive force generated by the plurality or resistive devices may cause loop 102 to rotate at 350 rotations per minute and cause generator 112 to generate a power output of 80 horse power or 60 kilowatts.

In some embodiments, power generator 100 may further include pulley 108 and shaft 110. Pulley 108 may be a wheel that is mechanically coupled to loop 102 and configured to be rotated based on a rotation of loop 102. Thus, pulley 108 may be a wheel that is 2 feet in diameter and is configured to rotate at between 420 to 500 rotations per minute in operation. In some embodiments, pulley 108 may be configured to include a groove in which loop 102 makes contact with pulley 108. A mechanical force generated by a contact area between loop 102 and pulley 108 may be sufficient to rotate pulley 108. Alternatively, one or more portions of loop 102 may have holes or perforations that fit on top of one or more pegs or ratchets of pulley 108. In this way, loop 102 may be coupled to pulley 108 such that a rotation of loop 102 is transferred to pulley 108. Accordingly, when the plurality of resistive devices generates a resistive force and transfers the resistive force to loop 102 and causes loop 102 to rotate, pulley 108 may be rotated as well.

Pulley 108 may be coupled to shaft 110, which may be a structural element configured to transfer the rotational force generated by the plurality of resistive devices, loop 102, and pulley 108 to generator 112, as discussed in greater detail below. Accordingly, shaft 110 may be directly coupled to pulley 108 by a coupling technique, such as welding. Alternatively, shaft 110 may be coupled to pulley 108 via a gearing mechanism, such as a planetary gear train or gear box, in which pulley 108 may be coupled to a planet gear which may be coupled to a sun gear coupled to shaft 110. Thus, the diameters of the planet gear and the sun gear may be configured to determine a ratio between a rotation of pulley 108 and shaft 110. For example, pulley 108 may rotate at 200 to 300 rotations per minute and may cause, via the gearing mechanism, shaft 110 to rotate at 420 to 500 rotations per minute. In another example, the planetary gear box may be configured to have a ratio of 14:1 which may provide a sufficient conversion of rotational force to drive a hydraulic pump on an airplane.

Power generator 100 may also include generator 112 which may be an electrical generator configured to generate electrical power based on a rotation of shaft 110. Accordingly, generator 112 may be configured to convert a mechanical force transferred by the rotation of shaft 110 into an electromotive force, or electrical energy that is supplied to the vehicle's electrical system. For example, the electrical energy generated by generator 112 may be provided to avionics and communications systems of an airplane. In some embodiments, instead of generator 112, power generator 100 may include a hydraulic pump. Thus, a hydraulic pump may convert a mechanical force transferred by a rotation of shaft 110 into a pressure delivered to or provided to one or more of the vehicle's hydraulic systems. For example, when generator 112 is a hydraulic pump or is coupled to a hydraulic pump and loop 102 is deployed and operational, the hydraulic pump may achieve an outlet flow of 40 gallons per minute.

In various embodiments, one or more components of power generator 100 may be configured to lock loop 102 in place such that loop 102 and the plurality of resistive devices coupled to loop 102 cannot rotate and function as a drag chute that provides reverse thrust that opposes the current direction of the motion of the plane. Thus, when locked in place, loop 102 and its plurality of resistive devices are not able to rotate and may function as a conventional drag chute. In some embodiments, the gearing mechanism may be configured to lock the rotation of loop 102. Alternatively, power generator 100 may further include a locking mechanism, such as a wheel lock, that is configured to lock the rotation of loop 102.

Moreover, in some embodiments, loop 102 is detachable. Thus, in response to automatically detecting a condition, such as a snag, interruption in rotation, or a large tensile force, one or more components of power generator 100 may cause the automatic release of loop 102. For example, loop 102 or pulley 108 may include a quick release mechanism configured to activate in response to detecting one or more of the aforementioned conditions. In some embodiments, the release of loop 102 may occur in response to an input provided by a user. For example, a pilot may provide an input to a button in a cockpit of the vehicle. In response to receiving the input, the button may cause one or more components of power generator 100 to release loop 102.

Figure 2A:
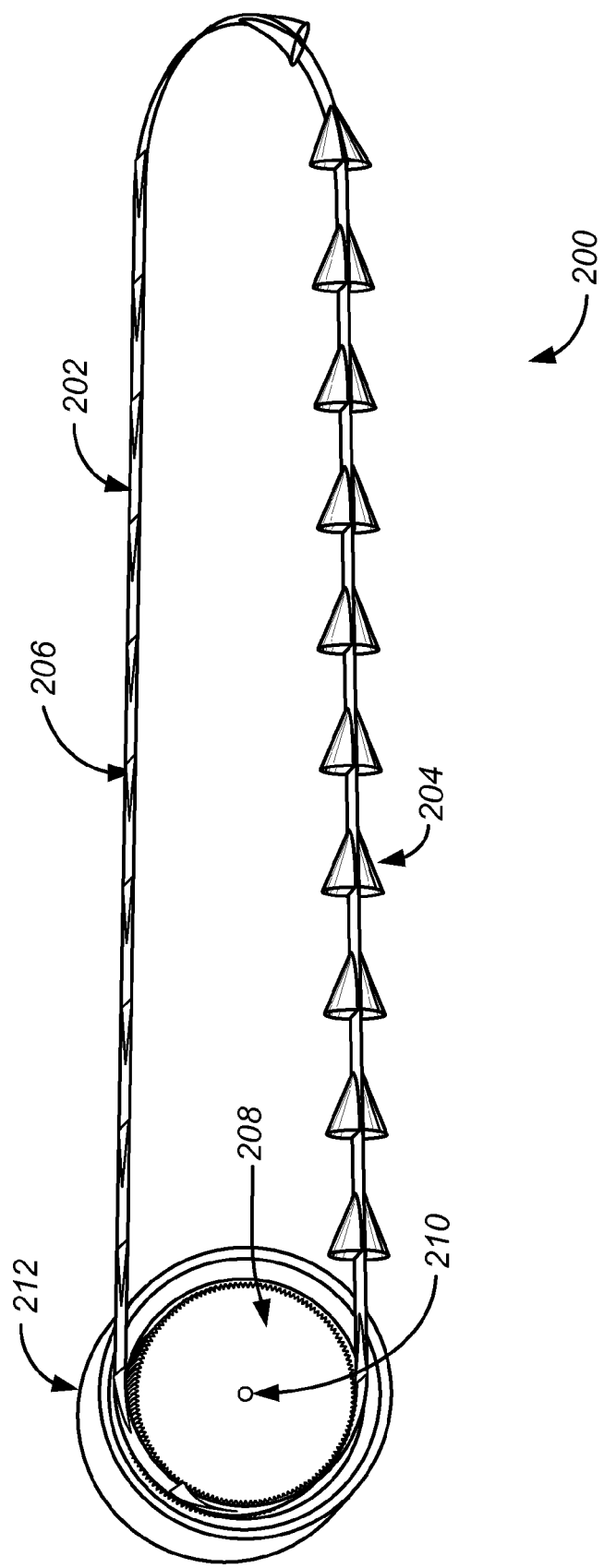
FIG. 2A illustrates another example of a power generator that may be deployed from a vehicle, in accordance with some embodiments.

FIG. 2A illustrates another example of a power generator that may be deployed in a vehicle, in accordance with some embodiments. As similarly discussed above with reference to power generator 100, power generator 200 may include loop 202, resistive device 204, resistive device 206, pulley 208, shaft 210, and generator 212. However, as shown in FIG. 2, loop 202 and the plurality of resistive devices coupled to loop 202 may be configured in a different structural configuration. For example, as shown in FIG. 2, loop 202 may be configured as a belt having a width configured to house or provide structural support for a side of a pocket or chute. Thus, a resistive device may be a pocket formed by a portion of material attached to or coupled to one or more sides of loop 202.

Accordingly, resistive device 204 may be a pocket or cavity formed by a portion of material coupled to loop 202. The material may be the same material as loop 202, or the same material as those discussed with reference to resistive device 104 of FIG. 1. Resistive device 204 may be configured in a first configuration having an opening facing a direction opposite to the direction of a flow of a medium that loop 202 is passing through. For example, if loop 202 is housed by and coupled to an airplane in flight, the opening of resistive device 204 may face a direction opposite to the flow of air past the airplane. In this way, the air may be caught or collected in the pocket formed by resistive device 204, thus generating a force, such as a drag force, that may be transferred to loop 202 and cause the rotation of loop 202 in a first direction.

Moreover, loop 202 may also be coupled to resistive device 206 which may be configured in a second configuration having an opening facing the same direction as a flow of the medium that loop 202 is passing through. Returning to the previous example, because the opening is not facing the flow of air past the airplane, no air is collected or caught in the pocket formed by resistive device 206, and no significant force is generated. Thus, resistive devices configured and oriented as resistive device 206 do not generate any significant force that opposes the force generated by resistive device 204. In this way, resistive devices configured and oriented in the first configuration may generate a force that is transferred to loop 202 in one rotational direction, while resistive devices configured and oriented in the second configuration do not generate a force. As similarly discussed above with reference to FIG. 1, as loop 202 rotates, a resistive device coupled to loop 202 may be configured to toggle or switch between the first configuration and the second configuration thus ensuring that a rotational force is generated and transferred to loop 202 in a single rotational direction.

Loop 202 may be coupled to pulley 208 and may cause pulley 208 to rotate. For example, pulley 208 may have a groove around its outer surface or edge in which loop 202 is seated. In this example, a frictional coefficient in a contact area between pulley 208 and loop 202 may be sufficient to couple loop 202 to pulley 208 and transfer a rotational force from loop 202 to pulley 208, thus causing pulley 208 to rotate. In another example, loop 202 may have perforations in one or more portions such as one or more outer edges. Pulley 208 may be configured to have pegs or other structural members configured to temporarily fit in the perforations of loop 202 in a contact area between loop 202 and pulley 208. The coupling between the perforations and the structural members may be sufficient to transfer a rotational force from loop 202 to pulley 208 and cause pulley 208 to rotate.

As similarly discussed above with reference to FIG. 1, pulley 208 may be coupled to shaft 210 and cause shaft 210 to rotate. Shaft 210 may be coupled to generator 212. In some embodiments, a gearing mechanism may be used to couple shaft 210 to generator 212. Generator 212 may convert the rotational force to electrical or hydraulic power and provide the generated power to one or more systems of the vehicle that houses power generator 200.

Figure 2B:
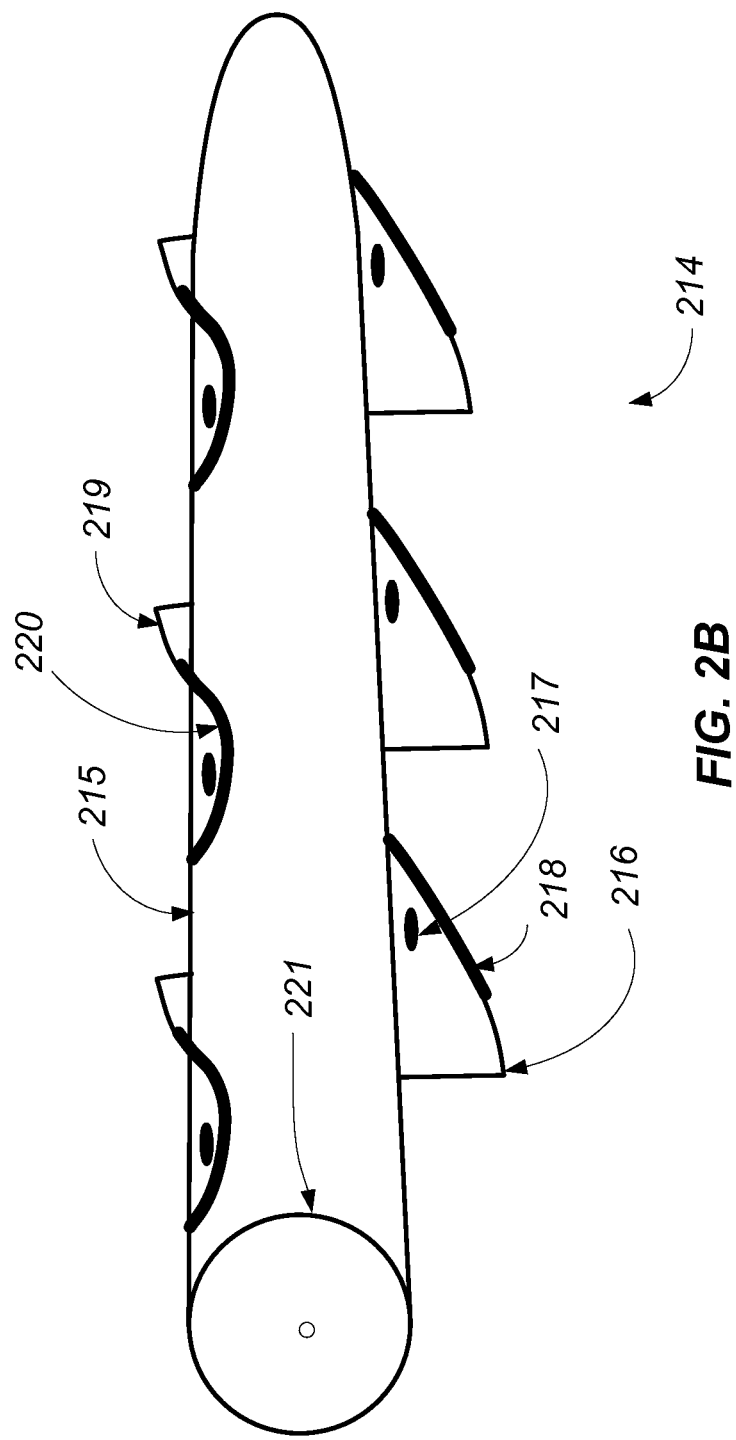
FIG. 2B illustrates yet another example of a power generator that may be deployed from a vehicle, in accordance with some embodiments.

FIG. 2B illustrates yet another example of a power generator that may be deployed from a vehicle, in accordance with some embodiments. As similarly discussed above with reference to power generator 200, power generator 214 may include loop 215, resistive device 216, resistive device 219, and pulley 221. In various embodiments, resistive devices included in power generator 214 may include vent 217 and batten 218. Vent 217 may be an exhaust vent or hole in a portion of a resistive device, such as resistive device 216. Vent 217 may allow a portion of the medium passing by loop 215 and collected in resistive device 216 to escape or leave resistive device 216, thus preventing tearing or other structural damage to resistive device 216. Batten 218 may be a rigid or semi-rigid structural member made of a material, such as fiberglass, and configured to provide structural support for resistive devices coupled to loop 215. When in a first configuration, as illustrated by resistive device 216, a batten, such as batten 218, may provide structural support for the material of resistive device 216, which may be a pocket or chute. When in a second configuration, as illustrated by resistive device 219, a batten, such as batten 220, may bow backwards to collapse resistive device 219 and provide minimal resistance to the medium through which power generator 214 is travelling.

Figure 2C:
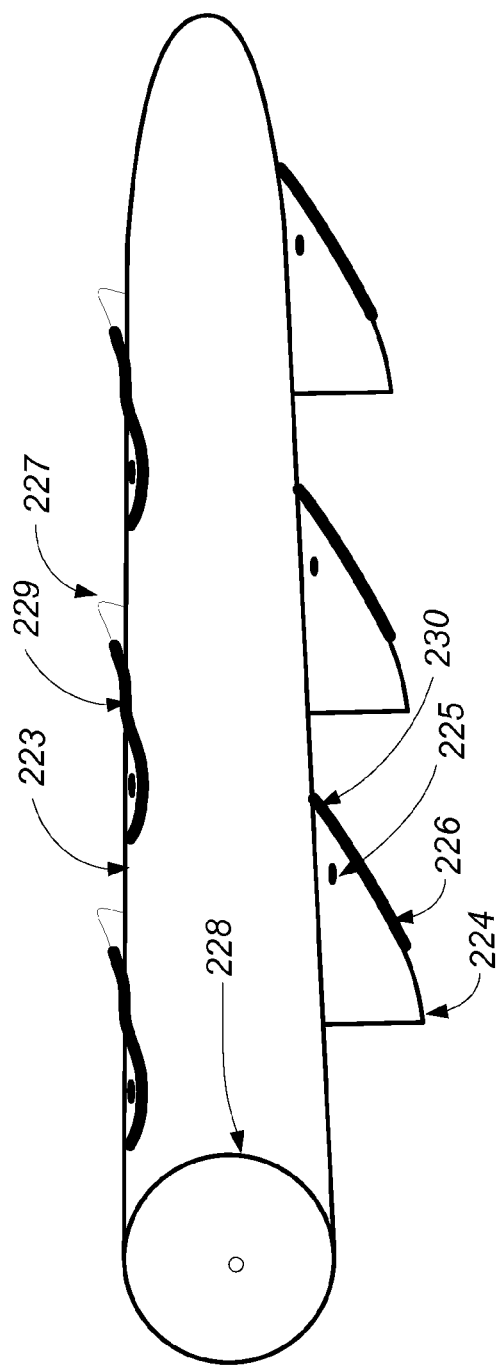
FIG. 2C illustrates an additional example of a power generator that may be deployed from a vehicle, in accordance with some embodiments.

FIG. 2C illustrates an additional example of a power generator that may be deployed from a vehicle, in accordance with some embodiments. As similarly discussed above with reference to power generator 200 and power generator 214, power generator 222 may include loop 223, resistive device 224, resistive device 227, and pulley 228. As similarly discussed above, vent 225 may allow a portion of the medium passing by loop 223 and collected in resistive device 224 to escape or leave resistive device 224, thus preventing tearing or other structural damage to resistive device 224. Air cell 226 may be a lumen or tube that may be stitched into a resistive device, such as resistive device 224. Air cell 226 may be configured to capture air flowing by power generator 222, and further configured to inflate based on the captured air. Air cell 226 may include vent 230, which may be configured to release the captured air. When in a first configuration, an air cell, such as air cell 226 may inflate based on a flow of air past power generator 222. When inflated, air cell 226 may provide structural support for resistive device 224. When in a second configuration, an air cell, such as air cell 229, may deflate such that resistive device 227 lies flat on loop 223 and provides minimal resistance to the medium through which power generator 222 is travelling.

Figure 2D:
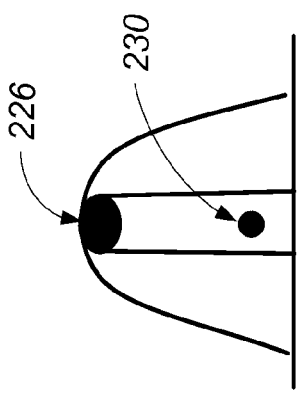
FIG. 2D illustrates a front view of an example of a resistive device, in accordance with some embodiments.

FIG. 2D illustrates a front view of an example of a resistive device, in accordance with some embodiments. As discussed above with reference to FIG. 2C, resistive device 224 may include air cell 226 and vent 230. As illustrated in FIG. 2D, when in the first configuration, air cell 226 is inflated and provides structural support for resistive device 224 that maintains resistive device 224 in the first configuration.

Figure 3:
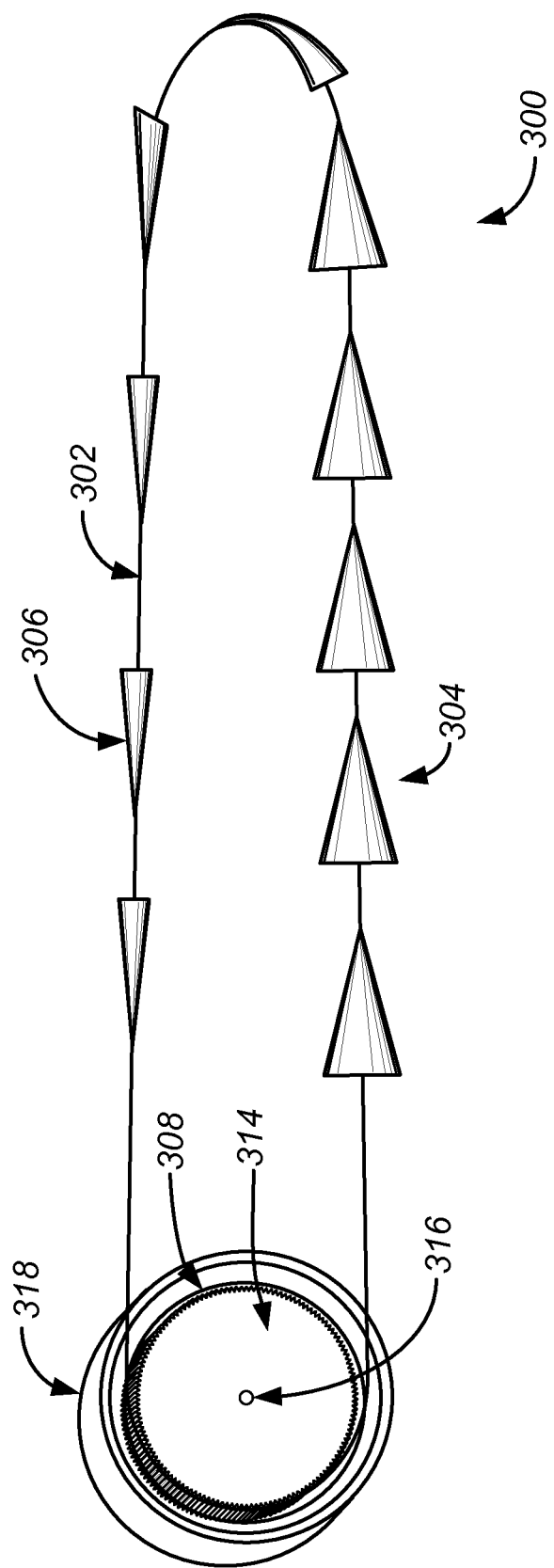
FIG. 3 illustrates an example of a power generator that includes multiple loops, in accordance with some embodiments.

FIG. 3 illustrates an example of a power generator that includes multiple loops, in accordance with some embodiments. As similarly discussed above, a vehicle, such as an airplane, may have various electrical and hydraulic systems that have various power requirements. Some systems may require a large amount of power, while other systems require a small amount of power. Accordingly, power generator 300 may be configured to include multiple loops that are each configured to generate an amount of power specific to a particular system or group of systems in a vehicle. For example, an airplane's high power systems may be powered by a first loop configured to generate a large amount of power, while the airplane's low power systems may be powered by a second loop configured to generate a small amount of power. The loops may be deployed independently or concurrently based on the power needs of the vehicle in a particular situation, such as an emergency situation.

Accordingly, power generator 300 may include a first loop, such as loop 302, and a second loop, such as loop 308. Loop 302 may include a plurality of resistive devices configured to generate power for a first set of systems in a vehicle, which may have lower power requirements, such as an aircraft's avionics and navigation systems. Such systems may frequently be used during high altitude operations in which the air through which an aircraft travels is thinner and passes the aircraft at a higher speed. One or more parameters of loop 302 and the plurality of resistive devices may be configured to generate an amount of power that is compatible with the first set of systems and compatible with high altitude operations. For example, a length of loop 302, a number of resistive devices coupled to loop 302, and a diameter of resistive devices, such as resistive device 304 and resistive device 306, may be determined based on a power requirement of the first set of systems and operation conditions associated with the first set of systems.

Similarly, loop 308 may include a plurality of resistive devices configured to generate power for a second set of systems in the vehicle, which may have high power requirements, such as the an aircraft's environmental control systems, flap/slat drive systems, and landing gear. Such systems may frequently be used during low altitude operations in which the air through which the aircraft travels is thicker and passes the aircraft at a lower speed. Thus, a length of loop 308, a number of resistive devices coupled to loop 308, and a diameter of the resistive devices may be determined based on a power requirement of the second set of systems and operation conditions associated with the second set of systems. In this example, because the second set of systems has a higher power requirement than the first set of systems, one or more parameters of loop 308 may be different than those of loop 302. For example, loop 308 may have more resistive devices that have larger diameters than those of loop 302.

Loop 302 and loop 308 may both be coupled to pulley 314. As similarly discussed above with reference to FIG. 1 and FIG. 2, loop 302 and loop 308 may be configured to rotate pulley 314, which may also cause the rotation of shaft 316. Shaft 316 may be coupled to generator 318, which may convert a rotational force transferred by shaft 316 into electrical or hydraulic power. As illustrated in FIG. 3, one or more of loop 302 and loop 308 may be deployed. In this instance, loop 302 is deployed and generating power, while loop 308 is not. In various embodiments, power generator 300 may include multiple pulleys. Thus, each of loop 302 and loop 308 may be coupled to its own pulley. The multiple pulleys may be coupled to multiple generators, or may be coupled to the same generator, such as generator 318, via one or more gearing mechanisms. Accordingly, while FIG. 3 illustrates an example of a configuration of power generator 300 that has multiple loops, multiple configurations of loops, pulleys, and generators are contemplated and disclosed herein.

Figure 4A:
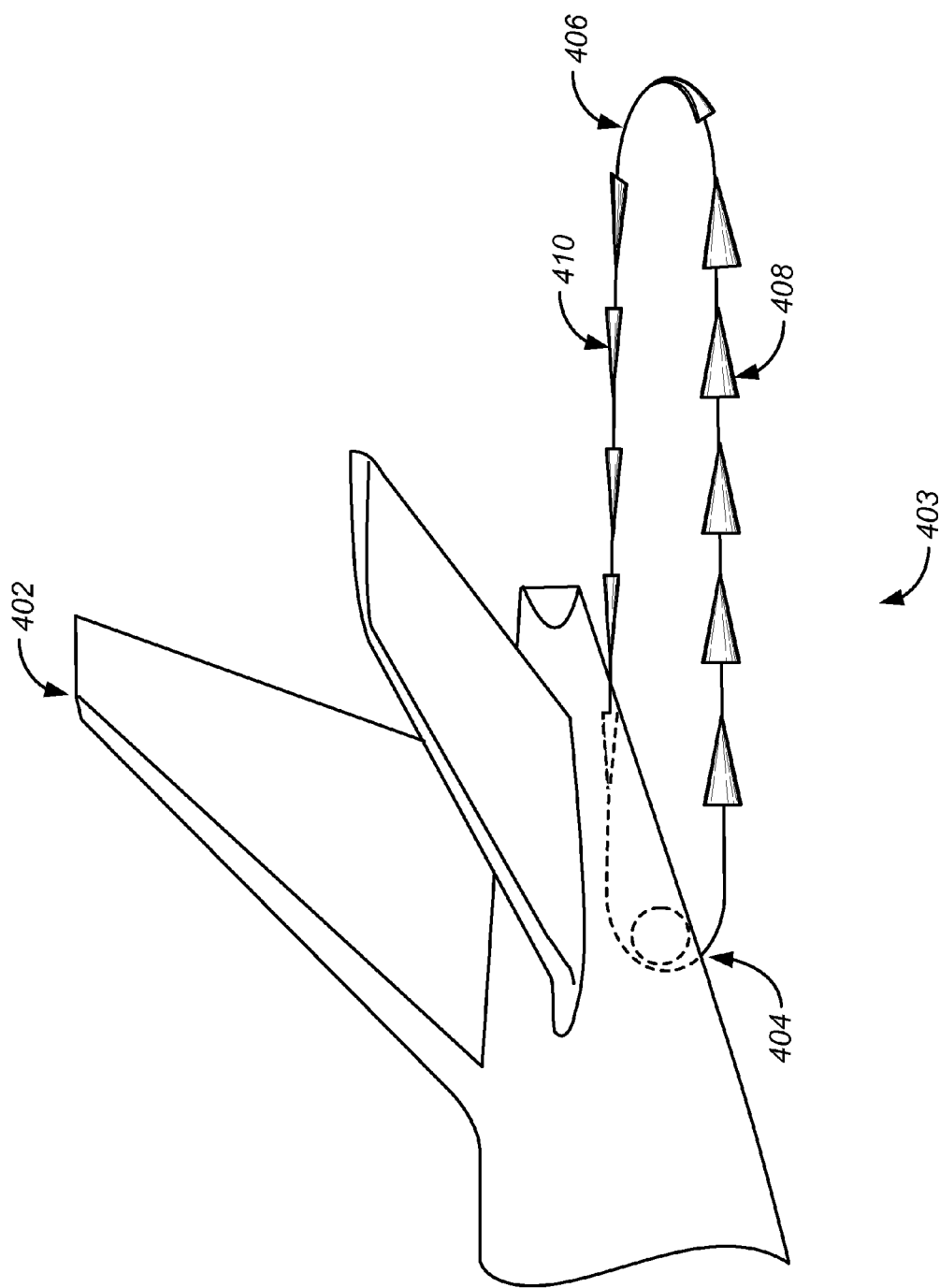
FIG. 4A illustrates a side view of a vehicle that has deployed a power generator, in accordance with some embodiments.

FIG. 4A illustrates a side view of a vehicle that has deployed a power generator, in accordance with some embodiments. As similarly discussed above, a vehicle, such as vehicle 402, may be an airplane configured to deploy power generator 403 in response to a situation or condition, such as a loss of power. Power generator 403 may include loop 406 and a plurality of resistive devices, such as resistive device 408 and resistive device 410. In some embodiments, power generator 403 may be anchored to or coupled to vehicle 402 at attachment point 404, which may include a compartment, such as storage compartment 103 discussed with reference to FIG. 1. The compartment may be configured to house one or more components of power generator 403, such as a generator and a pulley. In various embodiments, attachment point 404 may be configured to evenly distribute a force, such as a drag force, generated by one or more components of power generator 403. For example, attachment point 404 may be positioned halfway between the top and bottom of a rear portion of a fuselage of vehicle 402 so that the drag generated by the resistive devices of power generator 403 is evenly distributed about the centerline of vehicle 402 and does not deleteriously affect steering of vehicle 402.

Figure 4B:
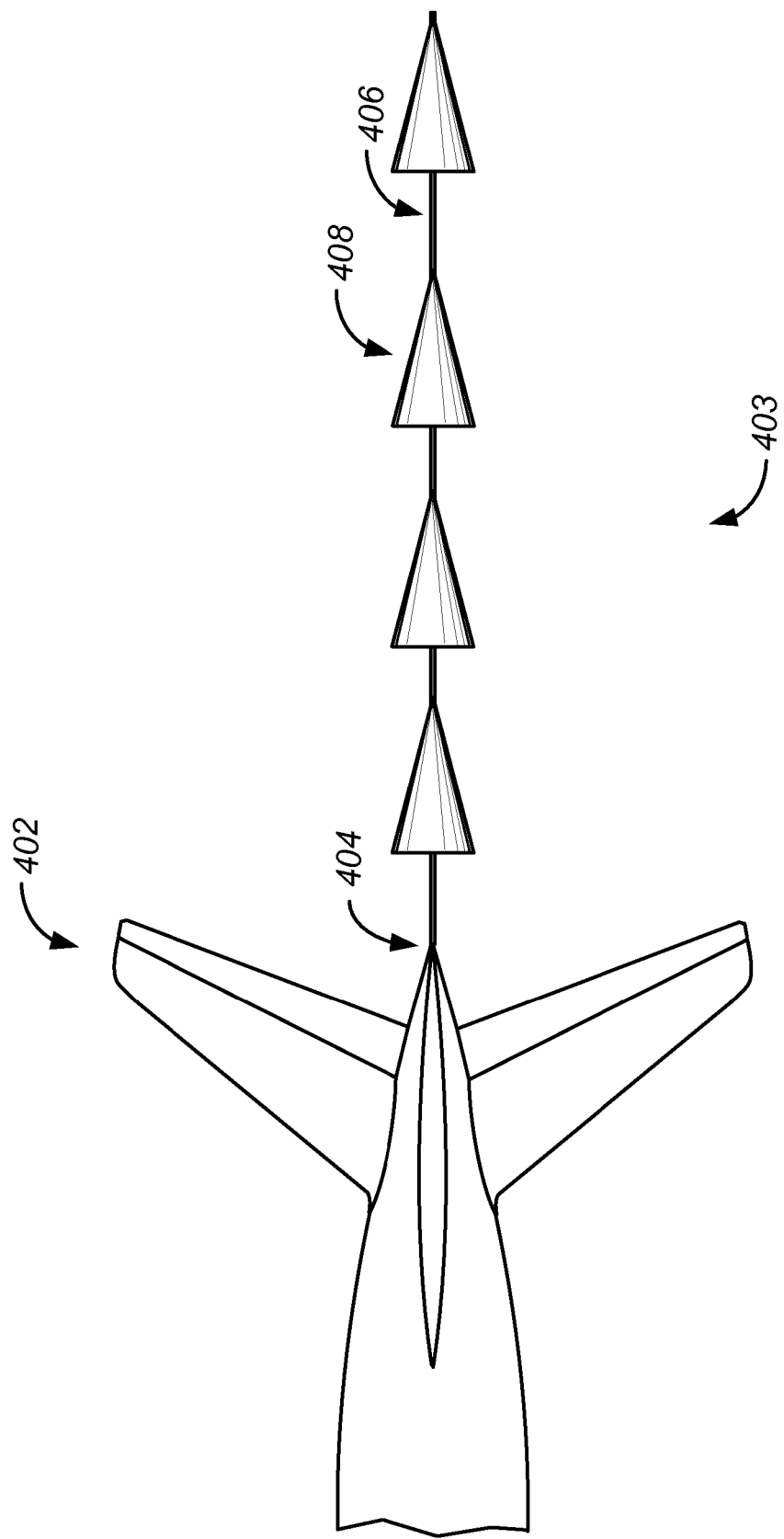
FIG. 4B illustrates a top view of a vehicle that has deployed a power generator, in accordance with some embodiments.

FIG. 4B illustrates a top view of a vehicle that has deployed a power generator, in accordance with some embodiments. As similarly discussed above with reference to FIG. 4A, vehicle 402 may be configured to deploy power generator 403 that may include loop 406 which may be coupled to a plurality of resistive devices, such as resistive device 408. As shown in FIG. 4B, power generator 403 may be coupled to vehicle 402 at attachment point 404 which may be configured to evenly distribute a drag force generated by power generator 403. For example, attachment point 404 may be positioned along a centerline of a fuselage of vehicle 402 and halfway between horizontal stabilizers of vehicle 402. In this way, drag generated by power generator 403 is evenly distributed along a lateral or horizontal direction of vehicle 402 and does not affect horizontal steering of vehicle 402.

Figure 5:
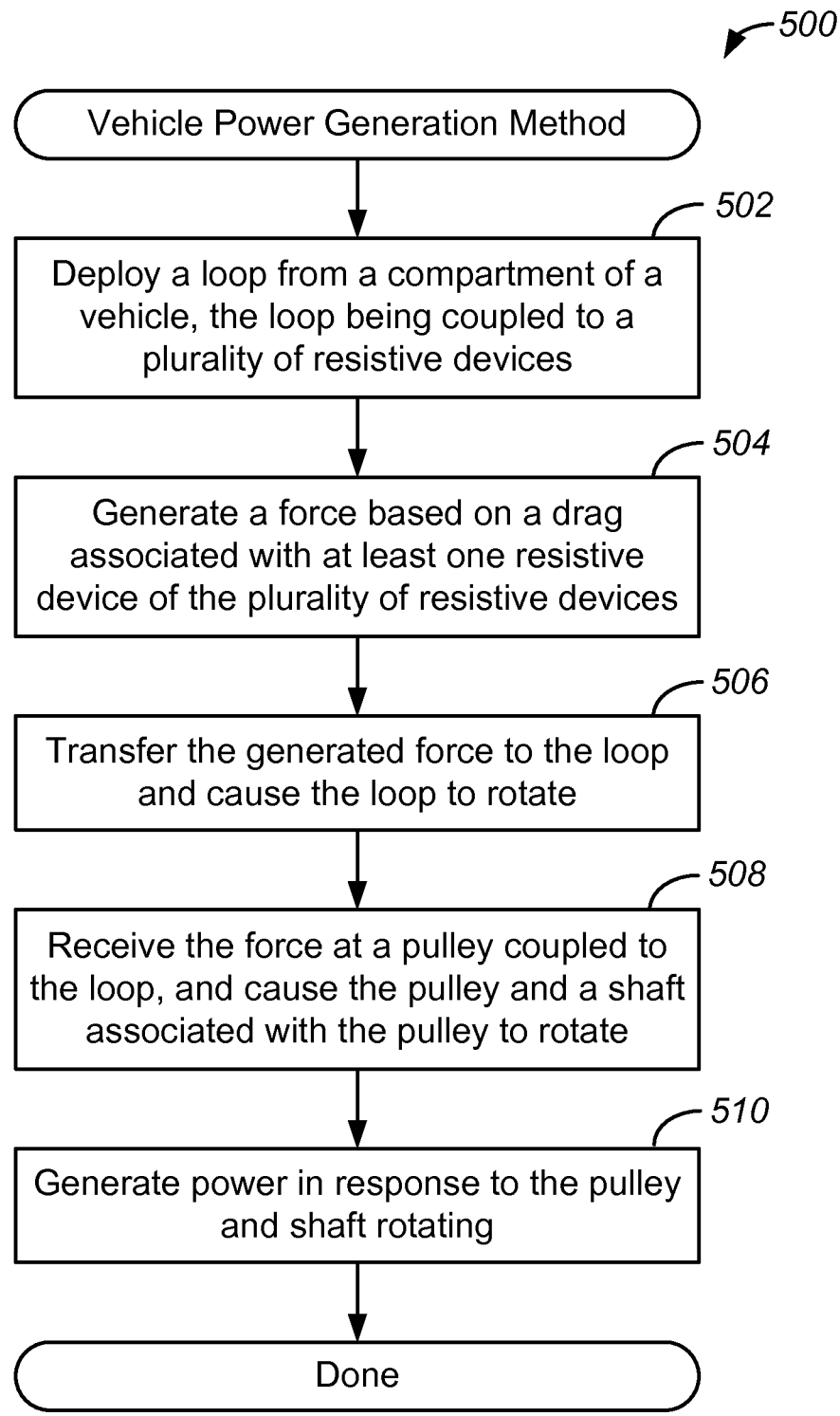
FIG. 5 illustrates an example of a flow chart of a method for deploying a power generator from a vehicle, implemented in accordance with some embodiments.

FIG. 5 illustrates an example of a flow chart of a method for deploying a power generator from a vehicle, implemented in accordance with some embodiments. As similarly discussed above, a vehicle may experience a situation or condition in which additional power is needed to power the vehicle's systems. For example, in an emergency, one or more components of the vehicle's power or hydraulic systems may stop working, thus causing a loss of power. In such a situation, a power generator may be deployed to generate additional power for the vehicle.

Accordingly, at step 502, a loop may be deployed from a compartment of a vehicle. The loop may be deployed automatically and in response to one or more sensing devices detecting or identifying one or more conditions, such as the failure of a primary power system. The loop may also be deployed manually, and in response to a user input. For example, a pilot or co-pilot of an airplane may provide an input to a button in the cockpit that causes the deployment of the loop. The loop may be deployed from a storage compartment in a portion of the vehicle. For example, an airplane may store the loop in a storage compartment in an empennage section of the plane. The storage compartment may include a set of exterior doors that open and enable the loop to be deployed from the interior of the storage compartment. As similarly discussed above, the loop may be coupled to a plurality of resistive devices which cause the loop to rotate when deployed.

Therefore, at step 504, a force may be generated based on a drag associated with at least one resistive device of the plurality of resistive devices. Once deployed, the loop and the plurality of resistive devices coupled to the loop are immersed in the airstream or flow of air that surrounds the vehicle. One or more of the resistive devices may be oriented to generate a drag force in response to contacting the flow of air. For example, several drag chutes coupled to the loop may inflate and generate a force based on a resistance to the flow of air. As similarly discussed above, the plurality of resistive devices are configured such that the resistive devices that are coupled to a particular portion or side of the loop generate a drag force, while the other resistive devices coupled to the loop do not.

At step 506, the generated force may be transferred to the loop and cause the loop to rotate. The force may be transferred to the loop from the each of the resistive devices via a structural member that couples the each resistive device to the loop. As similarly discussed above, each resistive device may be coupled to the loop by a fastening device or mechanism such as a clamp, series of staples or stitches, or adhesive or chemical bond. Therefore, a drag force generated by a resistive device's resistance to a flow of air may be transferred to the loop and cause the loop to rotate. Because the resistive devices are configured to generate a force on a single side or a particular portion of the loop, the total drag force transferred to the loop may be a unidirectional rotational force that causes the loop to rotate in a single direction.

At step 508, a pulley coupled to the loop may receive the force transferred to the loop. The received force may cause the pulley and a shaft associated with the pulley to rotate. Thus, a contact area between the loop and the pulley may have a sufficient frictional coefficient to enable the transfer of the rotational force from the loop to the pulley, thus causing the pulley and its associated shaft to rotate. As similarly discussed above, the pulley may also use additional coupling mechanisms, such as matching pegs and perforations, to enhance or provide mechanical coupling between the loop and the pulley that is sufficient to enable the transfer of the rotational force from the loop to the pulley and shaft.

At step 510, a power generator may generate power in response to the pulley and shaft rotating. The power generator may be configured to convert a mechanical rotation of the shaft into electrical energy or hydraulic power. Thus, in response to the shaft rotating, the generator may generate electrical power and provide the power to one or more systems of the vehicle. Once the generator is operational and generating power, the vehicle may have sufficient power to operate normally. In some embodiments, the generator may generate a signal that is provided to one or more portions of the vehicle, and that provides information or data about the functionality of the generator. For example, the generator may generate a first signal that indicates that the generator is operational and that the loop has been deployed. The generator may also generate a second signal which provides data about the operation of the generator, such as a number of rotations per minute that the loop is rotating at, and a total power output of the generator.

While method 500 has been described with reference to airplanes and the aerospace industry, it will be appreciated that the embodiments disclosed herein may be applied to any other context as well, such as automotive, railroad, and other mechanical and vehicular contexts.

Figure 6:
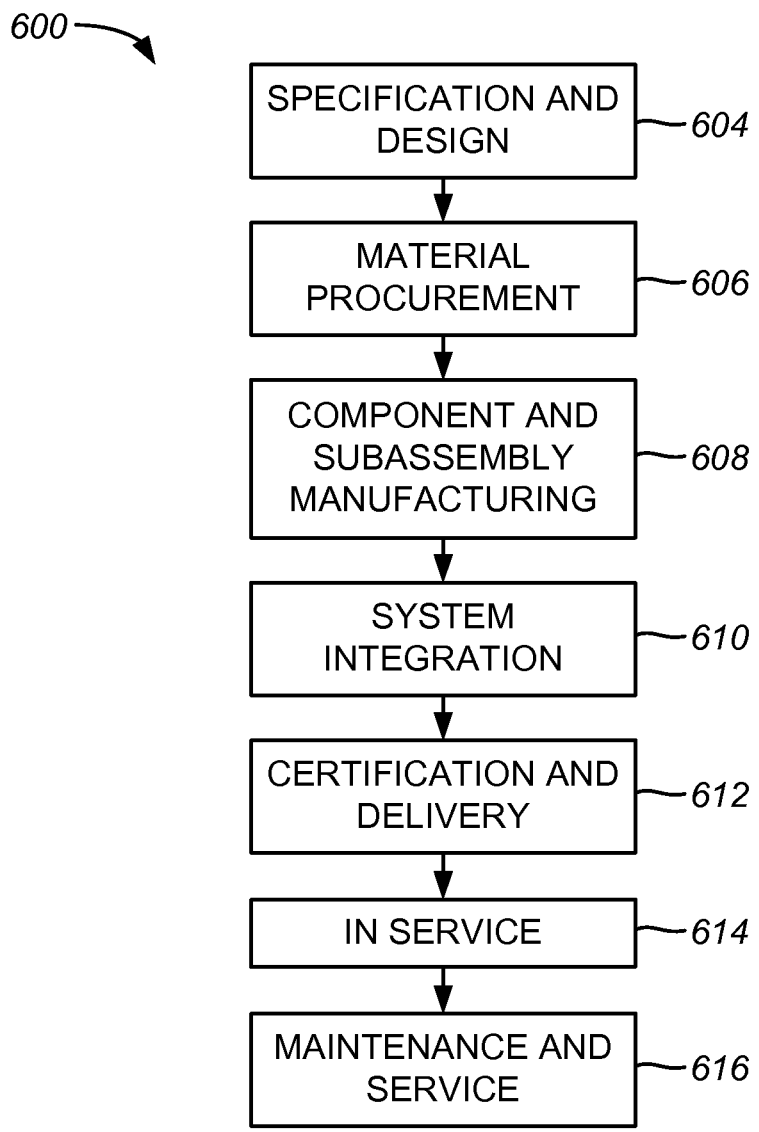
FIG. 6 illustrates a flow chart of an example of an aircraft production and service methodology, in accordance with some embodiments.
Figure 7:
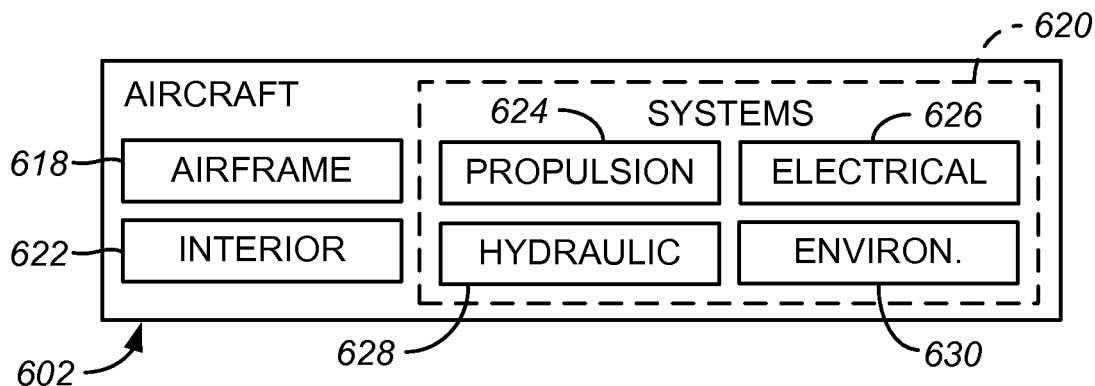
FIG. 7 illustrates a block diagram of an example of an aircraft, in accordance with some embodiments.

Accordingly, embodiments of the disclosure may be described in the context of an aircraft manufacturing and service method 600 as shown in FIG. 6 and an aircraft 602 as shown in FIG. 7. During pre-production, illustrative method 600 may include specification and design 604 of the aircraft 602 and material procurement 606. During production, component and subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 602 produced by illustrative method 600 may include an airframe 618 with a plurality of systems 620 and an interior 622. Examples of high-level systems 620 include one or more of a propulsion system 624, an electrical system 626, a hydraulic system 628, and an environmental system 630. Any number of other systems may be included. Although an aerospace example is shown, the principles of the invention may be applied to other industries, such as the automotive industry.

Apparatus and methods embodied herein may be employed during any one or more of the stages of the production and service method 600. For example, components or subassemblies corresponding to production process 608 may be fabricated or manufactured in a manner similar to components or subassemblies produced while the aircraft 602 is in service. Also, one or more apparatus embodiments, method embodiments, or a combination thereof may be utilized during the production stages 608 and 610, for example, by substantially expediting assembly of or reducing the cost of an aircraft 602. Similarly, one or more of apparatus embodiments, method embodiments, or a combination thereof may be utilized while the aircraft 602 is in service, for example and without limitation, to maintenance and service 616.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. An apparatus for generating power, the apparatus comprising:
    a first loop configured to be deployed from a portion of a vehicle;
    a first plurality of resistive devices coupled to the first loop, at least one resistive device of the first plurality of resistive devices being configured to transfer a force to the first loop, the force being generated based on an aerodynamic drag associated with the at least one resistive device;
    a pulley coupled to the first loop, the pulley being configured to receive the force transferred to the first loop, and the pulley being further configured to rotate in response to receiving the force from the first loop;
    a generator coupled to the pulley, the generator being coupled to an electrical system, and the generator being further configured to deliver power to the electrical system in response to the pulley rotating; and
    a locking mechanism configured to prevent a rotation of the first loop responsive to locking of the locking mechanism.

2. The apparatus of claim 1, wherein each resistive device of the first plurality of resistive devices is a parachute.

3. The apparatus of claim 2, wherein the first plurality of resistive devices is configured to generate 1000 pounds of force, and wherein the generator is configured to generate 60 kilowatts.

4. The apparatus of claim 1, wherein each resistive device of the first plurality of resistive devices is a pocket coupled to the first loop.

5. The apparatus of claim 1, wherein each resistive device of the first plurality of resistive devices is configured to toggle between a first configuration and a second configuration in response, at least in part, to a rotation of the first loop.

6. The apparatus of claim 5, wherein each resistive device of the first plurality of resistive devices is configured to generate at least a portion of the force when in the first configuration, and further configured to generate no force when in the second configuration.

7. The apparatus of claim 1 further comprising a gearing mechanism configured to couple the pulley to the generator.

8. The apparatus of claim 1, wherein the first plurality of resistive devices is configured to operate as a drag chute in response to the locking mechanism preventing the rotation of the first loop.

9. The apparatus of claim 1, wherein the generator is located along a centerline of a portion of an airplane.

10. The apparatus of claim 1 further comprising:
    a second loop coupled to the pulley; and
    a second plurality of resistive devices coupled to the second loop,
    wherein the first loop is configured to generate a first amount of power for a first set of vehicle systems, and wherein the second loop is configured to generate a second amount of power for a second set of vehicle systems.

11. The apparatus of claim 10, wherein the generator is configured to provide the first amount of power to a vehicle's high power systems during low altitude operation, and wherein the generator is further configured to provide the second amount of power to a vehicle's low power systems during high altitude operation.

12. A method for generating power, the method comprising:
    deploying a loop from a portion of a vehicle, the loop being coupled to a plurality of resistive devices;
    generating a force based on an aerodynamic drag associated with the at least one resistive device of the plurality of resistive devices;
    transferring the force to the loop, the transferring causing the loop to rotate;
    receiving, at a pulley coupled to the loop, the force transferred to the loop, the receiving causing the pulley to rotate;
    generating, at a power generator coupled to the pulley, power in response to rotating the pulley; and
    generating a plurality of signals indicating that the loop has been deployed and providing data associated with the deployment of the loop.

13. The method of claim 12, wherein each resistive device of the plurality of resistive devices is a pocket coupled to the loop.

14. The method of claim 12, wherein each resistive device of the plurality of resistive devices is a parachute, wherein the plurality of resistive devices generates 1000 pounds of force, and wherein the generator generates 60 kilowatts.

15. The method of claim 12, wherein the plurality of signals further comprises:
    a first signal indicating that the loop has been deployed; and
    a second signal providing data about an operation of one or more of the loop, pulley, and generator.

16. The method of claim 12 further comprising:
    locking, using a locking mechanism, the pulley and loop, wherein the locking prevents the rotation of the pulley and loop; and
    generating, using at least one resistive device of the plurality of resistive devices, reverse thrust.

17. A system for generating power for an airplane, the system comprising:
    the airplane having a rear portion;
    a loop configured to be deployed from the rear portion of the airplane;

a plurality of resistive devices coupled to the loop, at least one resistive device of the plurality of resistive devices being configured to transfer a force to the loop, the force being generated based on an aerodynamic drag associated with the at least one resistive device;

a pulley coupled to the loop, the pulley being configured to receive the force transferred to the loop, and the pulley being further configured to rotate in response to receiving the force from the loop;

a generator coupled to the pulley, the generator being further coupled to an electrical system, and the generator being configured to deliver power to the electrical system in response to the pulley rotating; and a locking mechanism configured to prevent a rotation of the loop responsive to locking of the locking mechanism.

18. The system of claim 17, wherein each resistive device of the plurality of resistive devices is a parachute, wherein the plurality of resistive devices is configured to generate 1000 pounds of force, and wherein the generator is configured to generate 60 kilowatts.

19. The system of claim 17, wherein each resistive device of the plurality of resistive devices is a pocket coupled to the loop.

20. The system of claim 17, wherein each resistive device of the plurality of resistive devices is configured to toggle between a first configuration and a second configuration in response, at least in part, to a rotation of the loop, and wherein each resistive device of the plurality of resistive devices is configured to generate at least some of the force when in the first configuration, and further configured to generate no force wherein the second configuration.

* * * * *